(No Model.)
I. W. PRICE.
VEHICLE BRAKE.
No. 592,168. Patented Oct. 19, 1897.
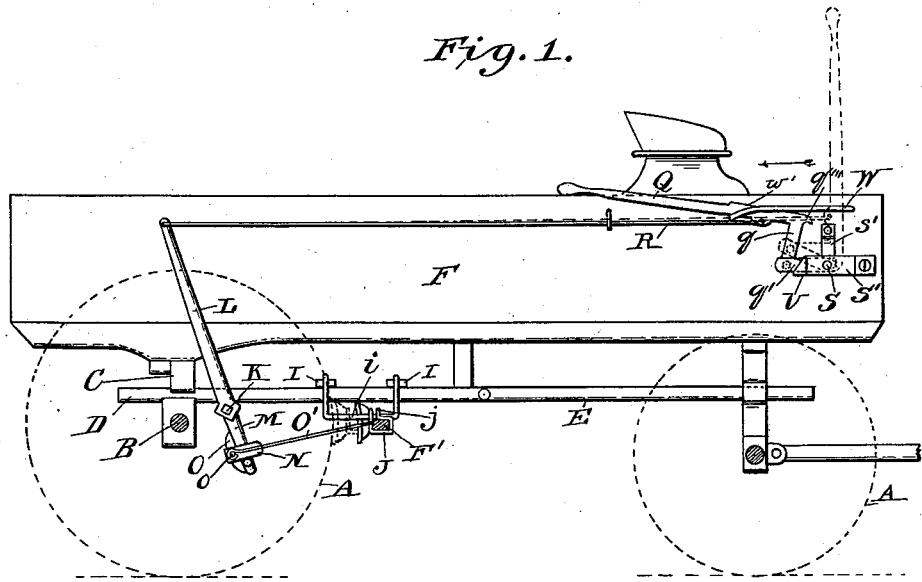
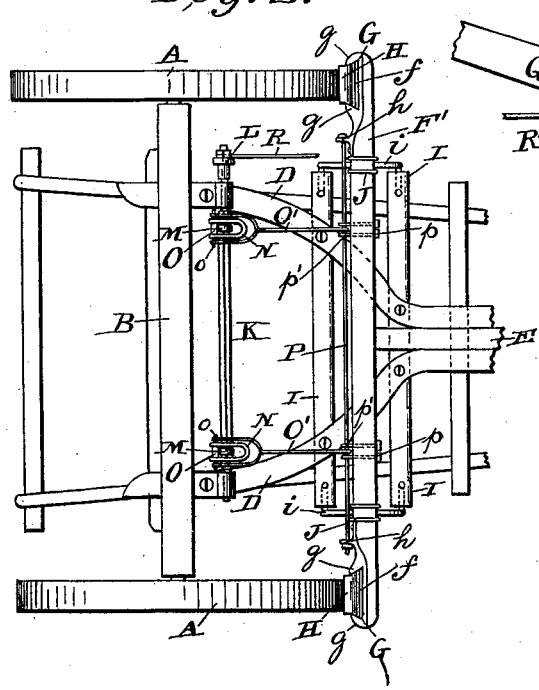
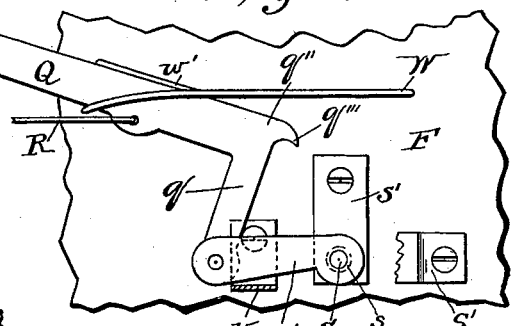
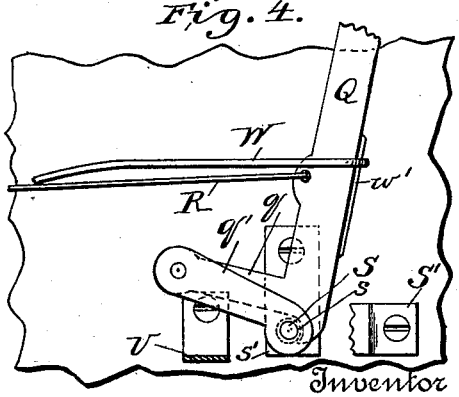
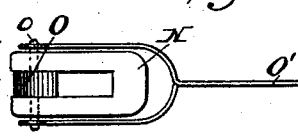
Witnesses
Jas. H. Blackwood
Hartwell M. Heath
Inventor
Isaac Walter Price
by D. A. Gourick
Attorney
THE NORRIS PETERS CO., PHOTO-LITHO., WASHINGTON, D. C.

UNITED STATES PATENT OFFICE.

ISAAC WALTER PRICE, OF ROSSEAU, OHIO.

VEHICLE-BRAKE.

SPECIFICATION forming part of Letters Patent No. 592,168, dated October 19, 1897.

Application filed February 23, 1897. Serial No. 624,649. (No model.)

*To all whom it may concern:*

Be it known that I, ISAAC WALTER PRICE, a citizen of the United States, residing at Rosseau, in the county of Morgan and State of Ohio, have invented certain new and useful Improvements in Vehicle-Brakes, of which the following is a specification.

My invention relates more particularly to brakes for wagons and other wheeled vehicles, but a part of the invention is adapted for use on sleds when the wagon-body to which it is attached is placed thereon.

One of the objects of my invention is to provide a brake-handle or operating-handle and draw-bar for setting a brake which may be readily operated and the brake quickly set and when not in use will permit the handle to lie in nearly a horizontal position at the side of the vehicle-body to which it is attached and where it will interfere but little with access to the body of the vehicle.

Another object of my invention is to provide a brake with means for setting it that will permit great play of the brake in front of the wheels against which it is applied, thereby permitting it to be thrown forward out of reach of the mud or earthy matter, which adheres at times to the circumference of the wheels.

Still another object of my invention is to provide means for attaching the draw-rods to the brake-bar which they operate and to the slides which are supported on the depending arms of the rock-shaft.

I accomplish the objects of my invention in the manner and by the means hereinafter more fully described in detail and claimed, reference being made to the drawings accompanying this specification, in which the same characters used as references indicate the same parts in all the figures of the drawings.

Figure 1 is a view of my improved brake attached to the right-hand side of a wagon-body, with the operating-lever lying down, the dotted lines showing the position of the operating-lever when the brake is set. Fig. 2 is a bottom plan showing the rear axle and hounds of a wagon having my improved brake attached; Figs. 3 and 4, detail views of the operating-lever. Fig. 5 is a detail view of the slide.

In carrying out my invention I use a part of the improvements in brakes for wheeled vehicles secured to me by Letters Patent of the United States No. 571,240, and the description of these parts as set forth in the patent referred to is used herein.

In the drawings the letters A, B, C, D, E, and F indicate the wheels, axle, bolster, hounds, reach, and bed or body, respectively, of a wagon of ordinary construction.

F' denotes a brake-bar with brake-shoes $f$ attached to each end thereof. The ends of the brake-bar have fitted thereon sockets G G, provided on their rear side with converging spurs or lugs $g$, between which spurs or lugs the brake-blocks H H are inserted endwise. Lugs $h\,h$, provided with eyes, project from the rear side of the inner end of each socket toward the middle of the bar. Two parallel bars I I rest on the hounds D D, and are secured thereto at a distance from each other with bolts, and their ends terminate outside of the points where the rear ends of the hounds rest on the axles. Depending rectangular loops $i\,i$ are secured to the ends of the bars I I, the ends of the arms of the loops being attached to the upper side of the bars and passing out over their ends, depending perpendicularly therefrom. The brake-bar is hung to these loops by means of links J J, which embrace the bar and have their ends turned over, and eyes $j\,j$ formed thereby, in which the loops $i\,i$ are secured. The brake-bar has ample play on the loops, the supporting-bar thereof being long enough to permit them to be moved a sufficient distance forward of the wheels to be entirely out of contact with any mud which may adhere to the circumference of the wheels. A rock-shaft K is journaled to each arm of the hounds D on the under side thereof just forward of the axle B, the end of the arm on the right side of the vehicle being shouldered and reduced to receive the arm of a lever L, which rises vertically therefrom, the end of the lever being provided with a squared aperture to fit on the reduced end of the rock-shaft, also squared. The lever L may be held in position on the end of the shaft by means of a nut fitted to the end thereof. The rock-shaft K has two depending arms M M, secured thereon by means of sleeves formed integral with their upper ends and fitting on the rock-shaft and rigidly secured thereon, one on each side of the reach E and between the arms of the hounds. Movably supported on each of the arms M M are two loops N N, each loop having rigidly secured between the arms thereof an antifriction-block O, which extends a distance above and below the arms of the loop and rests against the rear edge of the arm on which it is fitted. A pin o passes through the arm of the loop and through the block secured therein with each of its ends projecting a distance therefrom, and has secured thereto the arms of a draw-bar O', the forward end of which has a rod P passing through it, the rod P being headed at one end and threaded at the other end and secured in the eyes made in the lugs h, formed on the sockets G G. Additional means of firmly holding the rod to the brake-bar are provided, and consist of bolts p p, provided with eyes p' p', through which the rod P passes, the bolts being secured in the brake-bar at points on each side of the reach intermediate of the blocks thereon and the reach.

The manner in which the draw bars or rods are connected to the antifriction-blocks permits the block and the loop in which it is mounted to move freely up and down on the depending arms. To prevent the loops from dropping off the arms, pins or keys may be inserted in the lower ends of the arms. The rock-shaft is rocked by means of an L or bent lever Q, pivoted to the side of the wagon bed or body of the vehicle and having a draw-bar R secured to the lever Q and to the lever L on the end of the rock-shaft K. The bent lever Q has pivotally attached to the short arm q thereof a link q' of the same length as the arm q, the opposite end of which is pivoted on a bolt or pin S, the outer end of which is supported by a loop S', attached to the bed of the wagon or body of the vehicle F. The heel q'' of the lever Q is provided with a downwardly-projecting spur q''', that engages with the rod or pin S when the lever Q is lifted to a vertical position and forms the point of resistance of the end of the lever as the latter is drawn forward in the operation of setting the brake. The bolt or pin S passes through a sleeve s and through the end of a bracket s', attached at its opposite end to the vehicle-body, and has washers interposed between the loop and the body of the vehicle. The rear end of the loop S' is provided with a stirrup U, which supports the link q' when the brake is off the wheels. A rack W, provided with spurs or teeth, is secured to the body of the vehicle, and the lever Q is provided with a feather-edge w', that engages with the spurs or teeth and rigidly holds the brake against the circumference of the wheels when drawn into contact therewith. The construction of the brake-handle or operating-lever permits it to lie down in a horizontal position nearly on a level with the top of the side of the wagon-body.

The operation of the brake is as follows: When the handle of the brake Q is lifted, the heel drops down and rests on the sleeve s on the bolt or pin S. At the same time the depending arms attached to the rock-shaft are thrown back, the loops thereon supporting the antifriction-block move up the arms as they are drawn back, while the draw bars or rods connected to the loops on the depending arms pull the brake-shoes on the brake-bar into rigid contact with the outer circumferences of the wheels. The feather-edge of the brake-handle is then engaged with the teeth or spurs on the rack W. When the brake-handle is released and pushed backward, the brake-bar is pushed forward on the loops which support it and out of reach of the circumference of the wheels. The construction of the braking mechanism permits a much greater movement of the brake-bar than is obtained by the ordinary construction, while the use of the link-bar pivoted to the short arm of the bent lever allows the braking-handle to lie down at the side of the wagon-body, where it is out of the way.

Having thus described my invention, what I claim as new, and desire to secure by Letters Patent, is—

1. In brakes for vehicles, a lever for drawing said brake in contact with the wheels of the vehicles, provided with a short arm projecting at a right angle thereto, said arm having pivotally secured to its outer end a link pivoted at its opposite end to a bolt secured to the body of the vehicle, a rest or stirrup secured to the body of the vehicle for supporting said link and the short arm of said lever pivoted to said link, substantially as shown and described.

2. In a brake for vehicles the combination of the bent lever Q having the link pivoted to the end of the arm q of said lever and the other end of said link pivotally secured to the side of the body of the vehicle, and a draw-rod connecting with the long arm of the bent lever and with a rock-lever secured to the end of a rock-shaft provided with means for drawing a brake in contact with the wheels of the vehicle, substantially as shown and described.

3. In brakes for vehicles an operating-handle consisting of an L or bent lever provided with a short arm, said arm having pivotally attached to the outer end thereof a link-bar pivotally supported at the side of the vehicle-body by a bolt or pin supported at its outer and at its inner end in brackets attached to the body of the vehicle, the heel of the bent lever provided with a spur and said spur engaging with the rod or bolt supporting the end of the link-bar when the bent lever is drawn forward in setting the brake, substantially as shown and described.

4. In brakes for vehicles, an operating-lever for setting a brake consisting of a bent lever provided with a long arm for operating said brake, the short arm of said lever having a link pivoted to its end and said link pivotally secured at its opposite end to the body of the vehicle, a rack provided with spurs and the long arm of said bent lever provided with a feather-edge to engage with said spurs when said brake is set, substantially as shown and described.

5. A brake for wheeled vehicles, consisting of a brake-bar supported on loops attached to bars supported by the hounds of the vehicle, draw-rods connected with said brake-bar and with antifriction sliding blocks, a rock-shaft supporting said sliding blocks, a rocking lever secured to one end of said rock-shaft, a draw-rod connecting said rocking lever with an operating-lever having a bent arm and a link-rod pivoted to said bent arm and to a bolt or pin supported in a bracket attached to the side of the body of said vehicle substantially as shown and described.

6. In brakes for vehicles, antifriction-blocks secured in the ends of loops, draw-rods provided with arms pivotally secured to the sides of said loops on pins passing through said blocks and the arms of said loops, depending arms, rigidly secured to a rock-shaft journaled on the hounds of the vehicle, passing between the arms of the loops in which said blocks are secured, said draw-rods attached to a brake-bar and means for rocking said rock-shaft and drawing said brake in contact with the circumference of the wheels of a vehicle, substantially as shown and described.

In testimony whereof I hereto affix my signature in the presence of two witnesses.

ISAAC WALTER PRICE.

Witnesses:
FRANK HAMBEL,
GEO. TANNER.